April 10, 1956 — O. C. LEE — 2,741,285
SPHERE CUTTING DEVICE
Filed July 24, 1952
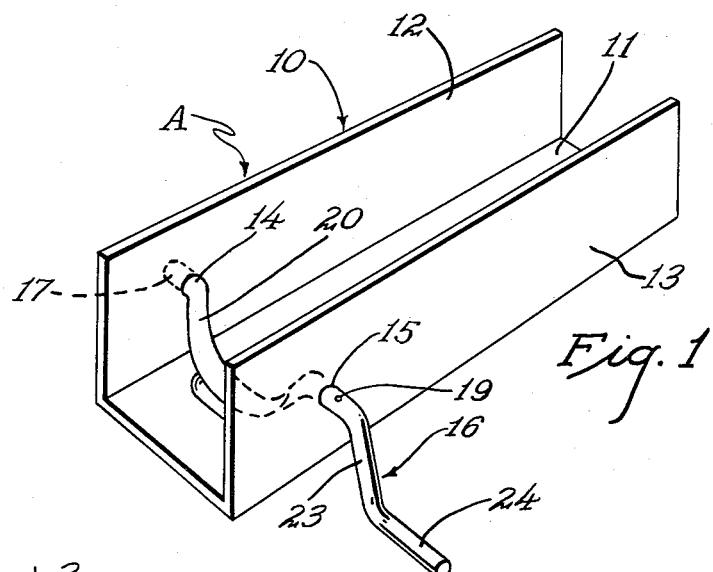
Fig. 1
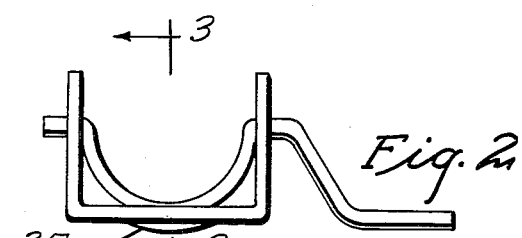
Fig. 2
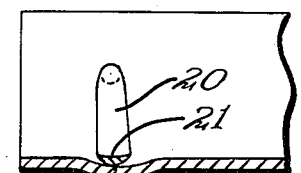
Fig. 3
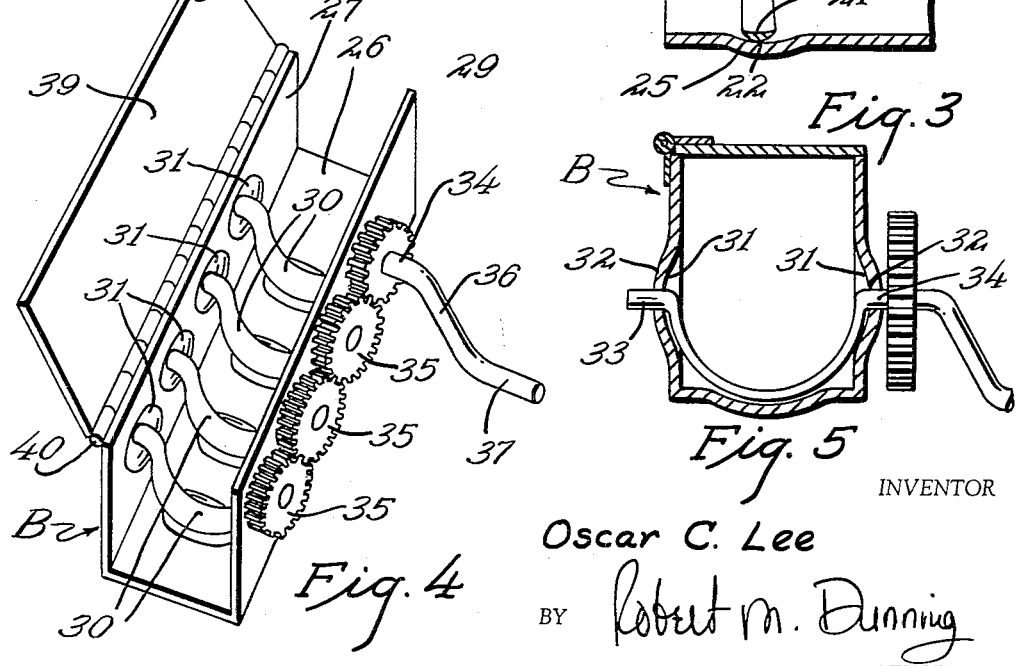
Fig. 4
Fig. 5
INVENTOR
Oscar C. Lee
BY Robert M. Dunning
ATTORNEY

United States Patent Office 2,741,285
Patented Apr. 10, 1956

2,741,285

SPHERE CUTTING DEVICE

Oscar C. Lee, River Falls, Wis.

Application July 24, 1952, Serial No. 300,593

3 Claims. (Cl. 146—106)

This invention relates to an improvement in sphere cutting devices and deals particularly with a cutting tool designed to cut spheres of any suitable material.

In the production of poisoned bait for killing rodents and the like, it is sometimes desirable to cut a vegetable into spherical shape so that it will roll when dropped into an opening or burrow. Also in producing various food products such as salads, desserts, and the like, it is sometimes desirable to cut vegetables and fruit into spherical balls. The present cutter is designed for use for these and other purposes.

The present invention resides in the provision of a cutter having a blade which is substantially semi-circular in shape. This blade is supported on pivots arranged in diametrically opposed relation at opposite ends of the cutting blade. By placing the material to be cut adjacent to the blade and rotating the blade through a complete revolution, the vegetable, fruit, or other material is cut into spherical shape.

A feature of the present invention lies in the provision of a cutting blade which is semi-circular in shape and which is rotatably supported for pivotal movement about an axis normal to the axis of the blade itself and on a plane through the blade. Thus by rotating the blade, the semi-circular cutting edge will cut material into spherical form.

A feature of the present invention resides in the provision of a holder which in preferred form is channel shaped and in supporting a blade for rotation between opposite sides of the channel. The channel acts to contain the material to be cut and the blade acts to cut the material into spherical form.

A further feature of the present invention resides in the provision of a cutter having a semi-circular blade, the periphery of which extends into a groove or notch in the holder so that the cutting edge of the blade is substantially flush with the inner surface of the holder. Thus spherical shaped portions may be cut with a minimum of waste.

An added feature of the present invention resides in the provision of a cutter which may include a series of blades connected for pivotal movement in unison. Thus when the material to be cut is placed adjacent to the blades, the blades may be rotated to cut spherical portions therefrom simultaneously.

A further feature of the present invention resides in the provision of a cutter which may include a holder of channel shaped form which may be provided with a cover or closure member hinged to an edge thereof. This cover may be used to force the vegetable, fruit, or other material into the channel shaped body without danger of cutting the fingers during the cutting operation.

These and other objects and novel features of the present invention will be more clearly and fully set forth in the following specification and claims.

In the drawings forming a part of the specification:

Figure 1 is a perspective view of my cutting device showing the construction thereof.

Figure 2 is an end elevation view of the cutter illustrated in Figure 1.

Figure 3 is a sectional view through the cutter shown in Figures 1 and 2, the position of the section being indicated by the line 3—3 of Figure 2.

Figure 4 is a perspective view of a modified form of cutting device.

Figure 5 is a sectional view through the cutting device illustrated in Figure 4.

The cutting device illustrated is extremely simple in form and is particularly suitable for cutitng spherical shapes out of strips or cylinders of material. For example the cutter is particularly well suited for cutting spheres from vegetables such as carrots, parsnips, and the like, which are normally somewhat conical in form. The cutter is also well suited for cutting spheres from strips of other fruits, vegetables and the like, these materials usually being first cut into strip form by a suitable cutter which may be of the type used for cutting French fried potatoes and the like.

The cutter is illustrated in general by the letter A and comprises a channel shaped holder 10 which includes a base 11 and parallel sides 12 and 13. A pair of aligned apertures 14 and 15 are provided in the wall panels 12 and 13. These apertures 14 and 15 are designed to support a cutter which is indicated in general by the numeral 16.

The cutter 16 includes a pintle 17 which is at one end and is aligned with a similar cylindrical portion 19 at the opposite side of the holder. The pintle 17 and the aligned cylindrical journal 19 are designed to extend through the opposed apertures 14 and 15 and to be rotatably supported thereby. The portion of the cutter connecting the pintle 17 and the journal 19 comprises a semi-circular blade 20 which is terminally connected to the pintle 17 and the journal 19.

As illustrated in Figure 3 of the drawings, the blade portion 20 is flattened and is provided with a substantially flat or slightly concave inner surface 21 when viewed in section. The outer surface 22 of the blade 20 when viewed in section is rounded or convex in shape, thus producing a blade which is crescent shaped in section or a portion of a circle bounded by a chord. The inner surface 21 is arranged to be substantially normal to a plane through the axes of the pintle 17 and journal 19 and through the center of the blade.

The journal 19 is off-set as indicated at 23 to terminate in a handle portion 24 substantially parallel to the journal 19. Thus the end of the cutter 16 comprises a crank by means of which the cutter may be rotated about the axis of the journal and pintle. In order that the blade be as nearly as possible flush with the base 11 of the holder, the base may be apertured or recessed as indicated at 25 to permit the blade to swing down into this indentation or recess.

The operation of the apparatus is simple from the foregoing description. A carrot or other product is placed in the holder to overlie the blade, usually while the blade is in the position shown in Figures 1 to 3 of the drawings. The crank handle 24 is then grasped and the blade rotated through one complete revolution. The semi-circular blade cuts a spherical shape from the carrot upon the completion of rotation. As the blade 20 is preferably provided with cutting edges on each side, the blade can be rotated in either direction. In some instances, the spherical shape is cut by first rotating the blade through part of a circle in one direction and then completing the cutting operation by rotating the blade in the opposite direction.

In Figures 4 and 5 of the drawings I disclose a cutter B which is quite similar in form to the cutter A. The cutter B includes a channel shaped holder including a base 26 and parallel side walls 27 and 29. A series of cutting blades 30 are pivotally supported by the opposite walls 27 and 29, the end of each blade being of sufficient length to extend through the wall. In preferred form I provide rounded concavities 31 in each of the walls. These concavities form rounded projections 32 on the outer surface of the holder. The purpose of these concavities is to permit the journal portions 33 and 34 of the blades to be entirely outside of the plane of the side walls. In other words, the semi-circular blade has its cutting surface substantially flush with the inner surfaces of the side walls so as to utilize the entire width of the object being cut. While the cutter B is shown to differ from the cutter A in this respect, it should be understood that the walls 12 and 13 of the holder 10 could be similarly concaved adjacent the supporting pintles.

The pintles or journals 34 of each of the cutters 30 extends beyond the surface of the side wall 29 and each journal supports a gear 35. One of the journals 34 extends beyond the others and is connected by the off-set 36 to a crank handle 37.

As the gears 35 of the various cutters are constantly in mesh, rotation of the crank handle 37 acts to rotate the various cutting blades and to cut a series of spheres from the material within the holder. In other words, the cutter B differs from the cutter A mainly in the fact that the cutter B may simultaneously cut a plurality of spheres in place of a single one.

A closure plate 39 is pivotally connected at 40 along an edge 27 of the channel shaped holder and this closure plate 39 may be pivoted over the material contained within the holder so as to hold this material in place. The closure plate 39 is particularly useful in holding the material when it is but slightly larger in vertical dimension than the diameter of the spheres being cut. By providing the closure plate, any chance of cutting the fingers while rotating the cutting knives is eliminated. Here again, while the closure plate 39 has been shown only in conjunction with the cutter B, a similar plate could be applied to the single bladed cutter A.

The cutting knives act to cut material into substantially spherical shape so that the cut parts are readily rotatable. This feature is of particular importance where the material cut comprises vegetables used for poison bait or the like, which are preferably spherical so that they can roll into the burrow or tunnel formed by the animal to be poisoned.

In accordance with the patent statutes, I have described the principles of construction and operation of my sphere cutting devices, and while I have endeavored to set forth the best embodiments thereof, I desire to have it understood that obvious changes may be made within the scope of the following claims without departing from the spirit of my invention.

I claim:

1. A device for cutting articles into spherical shapes comprising a channel-shaped holder including a base and upstanding side walls, a substantially semi-circular blade provided with axially aligned pintles extending on a diameter of the circular blade and journaled by said side walls, said base extending beneath and beyond the blade when said blade is in either of two horizontal positions, and a closure hinged to one side wall for pivotal movement across the open side of said channel-shaped holder, said closure being substantially coextensive with said base.

2. A cutter including a series of spaced blades mounted for rotation about parallel axes, said blades being semi-ring shaped in form and having a cutting edge along at least one side thereof, pintle means extending along a diameter through the ends of said blades, means connecting said pintle means for rotating said blades in unison, a holder supporting said blades which is substantially channel shaped in form, and including a closure pivotally connected to said channel shaped holder for pivotal movement across the open side of said channel.

3. A vegetable and salad cutter including in combination a longitudinally aligned series of spaced blades mounted for rotation about parallel axes, said blades being semi-ring shaped in form and having a cutting edge along at least one side thereof, pintle means extending along a diameter through the ends of said blades, means connecting said pintle means for rotating said blades in unison, and a holder for pivotally supporting said blades which is substantially channel-shaped in form.

References Cited in the file of this patent

UNITED STATES PATENTS

| Number | Name | Date |
|---|---|---|
| 781,899 | Nielsen | Feb. 7, 1905 |
| 1,263,153 | Topalian | Apr. 16, 1918 |
| 1,378,258 | Manderfield | May 17, 1921 |
| 2,007,558 | Bem | July 8, 1935 |
| 2,232,393 | Knaust | Feb. 18, 1941 |
| 2,568,300 | Poplawski | Sept. 18, 1951 |